United States Patent
Kayatani et al.

(10) Patent No.: US 9,530,565 B2
(45) Date of Patent: Dec. 27, 2016

(54) ELECTRONIC COMPONENT

(71) Applicant: Murata Manufacturing Co., Ltd., Nagaokakyo-shi, Kyoto-fu (JP)

(72) Inventors: Takayuki Kayatani, Nagaokakyo (JP); Yoshikazu Sasaoka, Nagaokakyo (JP); Kotaro Shimizu, Nagaokakyo (JP); Yasunori Taseda, Nagaokakyo (JP); Shinichiro Kuroiwa, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 226 days.

(21) Appl. No.: 14/517,957

(22) Filed: Oct. 20, 2014

(65) Prior Publication Data

US 2015/0116899 A1 Apr. 30, 2015

(30) Foreign Application Priority Data

Oct. 31, 2013 (JP) .................................. 2013-226757
Aug. 5, 2014 (JP) .................................. 2014-159121

(51) Int. Cl.
*H01G 4/232* (2006.01)
*H01G 4/30* (2006.01)
*H01C 7/00* (2006.01)

(52) U.S. Cl.
CPC .............. *H01G 4/232* (2013.01); *H01C 7/008* (2013.01); *H01G 4/30* (2013.01)

(58) Field of Classification Search
CPC .......... H01G 4/232; H01G 4/228; H01G 4/252
See application file for complete search history.

(56) References Cited

U.S. PATENT DOCUMENTS

| | | | | |
|---|---|---|---|---|
| 6,243,252 B1* | 6/2001 | Kuroiwa | .............. | H01G 4/2325 361/303 |
| 2003/0169556 A1* | 9/2003 | Yokoyama | .............. | B05C 1/027 361/309 |
| 2004/0240146 A1* | 12/2004 | Kayatani | ................ | H01G 2/103 361/306.3 |
| 2007/0297119 A1* | 12/2007 | Maegawa | .............. | H01G 4/232 361/306.3 |
| 2009/0002920 A1* | 1/2009 | Itamura | ................ | H01G 4/2325 361/321.3 |
| 2010/0202098 A1* | 8/2010 | Yanagida | ................ | H01G 4/232 361/305 |

(Continued)

FOREIGN PATENT DOCUMENTS

JP 2003-309373 A 10/2003

*Primary Examiner* — Eric Thomas
(74) *Attorney, Agent, or Firm* — Keating & Bennett, LLP

(57) ABSTRACT

An electronic component has dimensions (length×width×thickness) of about 0.6 mm to about 1.0 mm×about 0.3 mm to about 0.5 mm×about 0.07 mm to about 0.15 mm. An area of a triangle defined by a first hypothetical straight line being in contact with the top of a portion of an outer electrode positioned on a first main surface at a center in the width direction and extending in the length direction, a second hypothetical straight line being in contact with the top of a portion of the outer electrode positioned on the first end surface at the center in the width direction and extending in the thickness direction, and a third hypothetical straight line being in contact with the outer electrode at the center in the width direction and being inclined at about 45° with respect to the first and second hypothetical straight lines is about 450 $\mu m^2$ or larger.

15 Claims, 2 Drawing Sheets

(56) References Cited

U.S. PATENT DOCUMENTS

2014/0209363 A1* 7/2014 Oh .................... B24B 31/0218
 174/260
2014/0209364 A1* 7/2014 Oh ........................ B24B 19/22
 174/260

* cited by examiner

ELECTRONIC COMPONENT

BACKGROUND OF THE INVENTION

1. Field of the Invention

The present invention relates to an electronic component.

2. Description of the Related Art

Embedding an electronic component such as a capacitor in a wiring substrate in order to reduce the footprint of the electronic component has been proposed (see, for example, Japanese Unexamined Patent Application Publication No. 2003-309373).

The degree of contact between an electronic component that has been embedded in a wiring substrate and the wiring substrate may sometimes deteriorate.

SUMMARY OF THE INVENTION

Accordingly, preferred embodiments of the present invention provide an electronic component in which a degree of contact between the electronic component and a wiring substrate is less likely to deteriorate when the electronic component is embedded in the wiring substrate.

According to a preferred embodiment of the present invention, an electronic component includes an electronic component body, a first outer electrode, and a second outer electrode. The electronic component body includes first and second main surfaces, first and second side surfaces, and first and second end surfaces. The first and second main surfaces extend in a length direction and a width direction. The first and second side surfaces extend in the length direction and a thickness direction. The first and second end surfaces extend in the width direction and the thickness direction. The first outer electrode extends from the first end surface to the first main surface and the second main surface. The second outer electrode extends from the second end surface to the first main surface and the second main surface. The dimension of the electronic component in the length direction preferably is about 0.6 mm to about 1.0 mm, for example. The dimension of the electronic component in the width direction preferably is about 0.3 mm to about 0.5 mm, for example. The dimension of the electronic component in the thickness direction preferably is about 0.07 mm to about 0.15 mm, for example. Each of the area of a first triangle, the area of a second triangle, the area of a third triangle, and the area of a fourth triangle preferably is about 450 $\mu m^2$ or larger, for example. When the electronic component is projected from the first side surface or the second side surface, the first triangle is defined by a first hypothetical straight line that is in contact with the top of a portion of the first outer electrode, which is positioned on the first main surface, and that extends in the length direction, a second hypothetical straight line that is in contact with the top of a portion of the first outer electrode, which is positioned on the first end surface, that extends in the thickness direction, and that is perpendicular or substantially perpendicular to the first hypothetical straight line, and a third hypothetical straight line that is in contact with the first outer electrode and that is inclined preferably at about 45° with respect to the first and second hypothetical straight lines, for example. When the electronic component is projected from the first side surface or the second side surface, the second triangle is defined by the second hypothetical straight line, a fourth hypothetical straight line that is in contact with a top of a portion of the first outer electrode, which is positioned on the second main surface, that extends in the length direction, and that is perpendicular or substantially perpendicular to the second hypothetical straight line, and a fifth hypothetical straight line that is in contact with the first outer electrode and that is inclined preferably at about 45° with respect to the second and fourth hypothetical straight lines, for example. When the electronic component is projected from the first side surface or the second side surface, the third triangle is defined by a sixth hypothetical straight line that is in contact with a top of a portion of the second outer electrode, which is positioned on the first main surface, and that extends in the length direction, a seventh hypothetical straight line that is in contact with a top of a portion of the second outer electrode, which is positioned on the second end surface, that extends in the thickness direction, and that is perpendicular or substantially perpendicular to the sixth hypothetical straight line, and an eighth hypothetical straight line that is in contact with the second outer electrode and that is inclined preferably at about 45° with respect to the sixth and seventh hypothetical straight lines, for example. When the electronic component is projected from the first side surface or the second side surface, the fourth triangle is defined by the seventh hypothetical straight line, a ninth hypothetical straight line that is in contact with a top of a portion of the second outer electrode, which is positioned on the second main surface, that extends in the length direction, and that is perpendicular or substantially perpendicular to the seventh hypothetical straight line, and a tenth hypothetical straight line that is in contact with the second outer electrode and that is inclined preferably at about 45° with respect to the seventh and ninth hypothetical straight lines, for example.

In the electronic component according to a preferred embodiment of the present invention, it is preferable that each of the areas of the first triangle, the second triangle, the third triangle, and the fourth triangle preferably be about 1,200 $\mu m^2$ or smaller, for example.

In the electronic component according to a preferred embodiment of the present invention, the first and second outer electrodes may include Cu plating films that define surface layers of the first and second outer electrodes.

In various preferred embodiments of the present invention, electronic components in which degrees of contact between each electronic component and a wiring substrate is less likely to deteriorate when the electronic component is embedded in the wiring substrate are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
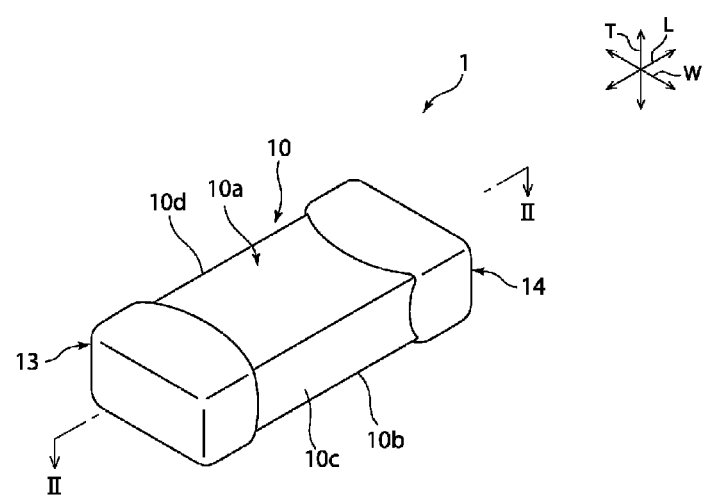
FIG. 1 is a schematic perspective view of a multilayer ceramic electronic component according to a preferred embodiment of the present invention.

Examples of preferred embodiments of the present invention will be described below. Note that the following preferred embodiments are merely examples. The present invention is in no way limited to the following preferred embodiments.

In the drawings that will be referred to in the description of preferred embodiments and so forth, members that have the same or substantially the same functions are referred to by the same reference numerals. In addition, the drawings that will be referred to in the description of preferred embodiments and so forth are schematically illustrated. Dimensional ratios and so forth of objects that are illustrated in the drawings may sometimes be different from dimensional ratios and so forth of actual object. The dimensional ratios and so forth of the objects may also sometimes differ between the drawings. The specific dimensional ratios and so forth of the objects should be determined by taking the following description into consideration.

Figure 2:
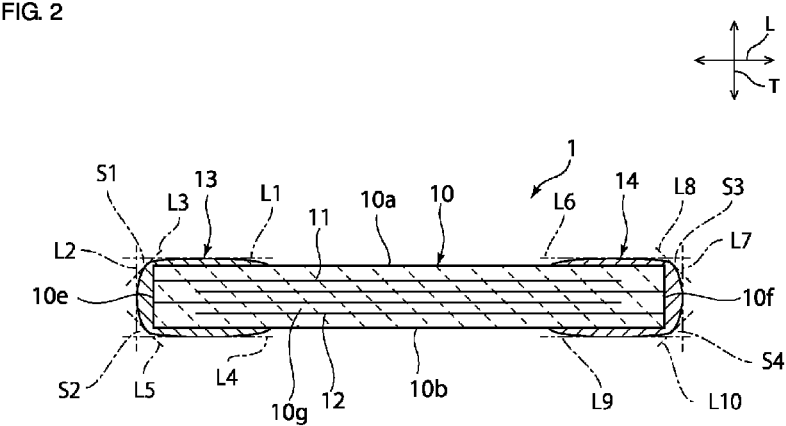
FIG. 2 is a schematic sectional view taken along line II-II of FIG. 1.

FIG. 1 is a schematic perspective view of a multilayer ceramic electronic component according to the present preferred embodiment. FIG. 2 is a schematic sectional view taken along line II-II of FIG. 1.

In the present preferred embodiment, a multilayer ceramic electronic component 1 that is illustrated in FIG. 1 and FIG. 2 will be described as an example of an electronic component. The multilayer ceramic electronic component 1 may be a ceramic capacitor or may be a piezoelectric component, a thermistor, an inductor, or the like.

The dimension of the multilayer ceramic electronic component 1 in a length direction L preferably is about 0.6 mm to about 1.0 mm, for example. The dimension of the multilayer ceramic electronic component 1 in a width direction W preferably is about 0.3 mm to about 0.5 mm, for example. The dimension of the multilayer ceramic electronic component 1 in a thickness direction T preferably is about 0.07 mm to about 0.15 mm, for example. It is preferable that the ratio of the dimension of the multilayer ceramic electronic component 1 in the length direction L to the dimension of the multilayer ceramic electronic component 1 in the width direction W ((dimension of multilayer ceramic electronic component 1 in length direction L)/(dimension of multilayer ceramic electronic component 1 in width direction W)) preferably is about 1.20 to about 3.33, for example. It is preferable that the ratio of the dimension of the multilayer ceramic electronic component 1 in the thickness direction T to the dimension of the multilayer ceramic electronic component 1 in the length direction L ((dimension of multilayer ceramic electronic component 1 in thickness direction T)/(dimension of multilayer ceramic electronic component 1 in length direction L)) preferably is about 4.00 to about 14.29, for example.

The multilayer ceramic electronic component 1 includes an electronic component body 10 that preferably has a rectangular or substantially rectangular parallelepiped shape. The electronic component body 10 includes a first main surface 10a, a second main surface 10b, a first side surface 10c, a second side surface 10d, a first end surface 10e, and a second end surface 10f (see FIG. 2). The first main surface 10a and the second main surface 10b extend in the length direction L and the width direction W. The first side surface 10c and the second side surface 10d extend in the length direction L and the thickness direction T. The first end surface 10e and the second end surface 10f extend in the width direction W and the thickness direction T. The length direction L, the width direction W, and the thickness direction T are perpendicular to one another.

Note that, in the description of various preferred embodiments of the present invention, the term "substantially rectangular parallelepiped shape" includes a rectangular parallelepiped shape including a corner portion and a ridgeline portion that are rounded. In other words, members that have a "substantially rectangular parallelepiped shape" means members in general that have first and second main surfaces, first and second side surfaces, and first and second end surfaces. In addition, projections, depressions, and the like may be provided on and in portions of or over the entire main surfaces, side surfaces, and end surfaces.

The electronic component body 10 is preferably made of an appropriate ceramic corresponding to functionality of the multilayer ceramic electronic component 1. More specifically, in the case where the multilayer ceramic electronic component 1 is a capacitor, the electronic component body 10 can be made of a dielectric ceramic. Specific examples of the dielectric ceramic include, for example, $BaTiO_3$, $CaTiO_3$, $SrTiO_3$, and $CaZrO_3$. Subcomponents such as, for example, a Mn compound, a Mg compound, a Si compound, an Fe compound, a Cr compound, a Co compound, a Ni compound, and a rare earth compound may be suitably added to the electronic component body 10 in accordance with required characteristics for the multilayer ceramic electronic component 1.

In the case where the multilayer ceramic electronic component 1 is a piezoelectric component, the electronic component body 10 can be made of a piezoelectric ceramic. Specific examples of the piezoelectric ceramic include, for example, a lead zirconate titanate (PZT)-based ceramic.

In the case where the multilayer ceramic electronic component 1 is, for example, a thermistor, the electronic component body 10 can be made of a semiconductor ceramic. Specific examples of the semiconductor ceramic include, for example, a spinel-based ceramic.

In the case where the multilayer ceramic electronic component 1 is, for example, an inductor, the electronic component body 10 can be made of a magnetic ceramic. Specific examples of the magnetic ceramic include, for example, a ferrite ceramic.

As illustrated in FIG. 2, a plurality of first inner electrodes 11 and a plurality of second inner electrodes 12 are arranged within the electronic component body 10.

The first inner electrodes 11 and the second inner electrodes 12 are alternately disposed in the thickness direction T. One of the first inner electrodes 11 and one of the second inner electrodes 12 that are adjacent to each other in the thickness direction T face each other with a ceramic portion 10g interposed therebetween. The thickness of the ceramic portion 10g preferably is about 0.6 μm to about 1.8 μm and is preferably about 0.8 μm to about 1.2 μm, for example.

Each of the first inner electrodes 11 has a rectangular or substantially rectangular shape. The first inner electrodes 11 are preferably parallel or substantially parallel to the first main surface 10a and the second main surface 10b. In other words, the first inner electrodes 11 are arranged along the length direction L and the width direction W. The first inner electrodes 11 are exposed at the first end surface 10e and are not exposed at the first main surface 10a, the second main surface 10b, the first side surface 10c, the second side surface 10d, and the second end surface 10f.

Each of the second inner electrodes 12 preferably has a rectangular or substantially rectangular shape. The second inner electrodes 12 are preferably parallel or substantially parallel to the first main surface 10a and the second main surface 10b. In other words, the second inner electrodes 12 are arranged along the length direction L and the width direction W. Thus, the second inner electrodes 12 and the first inner electrodes 11 are preferably parallel or substantially parallel to one another. The second inner electrodes 12 are exposed at the second end surface 10*f* and are not exposed at the first main surface 10*a*, the second main surface 10*b*, the first side surface 10*c*, the second side surface 10*d*, and the first end surface 10*e*.

The first inner electrodes 11 and the second inner electrodes 12 can be made of an appropriate conductive material. The first inner electrodes 11 and the second inner electrodes 12 can be made of, for example, a metal selected from the group consisting of Ni, Cu, Ag, Pd, and Au or an alloy (e.g., Ag—Pd alloy) containing at least one kind of metal selected from the group consisting of Ni, Cu, Ag, Pd, and Au.

It is preferable that the thickness of each of the first inner electrodes 11 and each of the second inner electrodes 12 preferably be, for example, about 0.3 µm to about 1.0 µm.

As illustrated in FIG. 1 and FIG. 2, the multilayer ceramic electronic component 1 includes a first outer electrode 13 and a second outer electrode 14.

The first outer electrode 13 is electrically connected to the first inner electrodes 11 at the first end surface 10*e*. The first outer electrode 13 preferably extends from the first end surface 10*e* to the first main surface 10*a*, the second main surface 10*b*, the first side surface 10*c*, and the second side surface 10*d*.

On the other hand, the second outer electrode 14 is electrically connected to the second inner electrodes 12 at the second end surface 10*f*. The second outer electrode 14 preferably extends from the second end surface 10*f* to the first main surface 10*a*, the second main surface 10*b*, the first side surface 10*c*, and the second side surface 10*d*.

The first outer electrode 13 and the second outer electrode 14 each can be made of an appropriate metal such as Ni, Cu, Ag, Pd, Au, or Ag—Pd alloy. The first outer electrode 13 and the second outer electrode 14 each may be, for example, a fired electrode on which a conductive paste has been baked or may be formed of a multilayer body that is formed of such a fired electrode and a plating film that is formed on the fired electrode. In this case, it is preferable that the outermost layers of the first outer electrode 13 and the second outer electrode 14 be formed of a Cu plating film.

As described above, the degree of contact between an electronic component that has been embedded in a wiring substrate and the wiring substrate may sometimes deteriorate. For example, when the temperature of a wiring substrate in which an electronic component has been embedded changes, the thermal expansion coefficient of the electronic component and the thermal expansion coefficient of the wiring substrate become different from each other, and thus, a stress is applied between the electronic component and the wiring substrate. It is believed that this stress is a reason for the deterioration of the degree of contact between the wiring substrate and the electronic component. In recent years, in order to cause the thermal expansion coefficient of a wiring substrate to approximate to the thermal expansion coefficient of silicon, the percentage of an inorganic filler in a resin wiring substrate has been increased. Thus, a problem in that the percentage of a resin in such a resin wiring substrate is small, and that a sufficient degree of contact between the resin wiring substrate and an electronic component cannot be obtained, so that the resin wiring substrate and the electronic component easily separate from each other is becoming apparent.

In the multilayer ceramic electronic component 1, the area S1 of a triangle that is defined by a first hypothetical straight line L1 that is in contact with the top of a portion of the first outer electrode 13, which is positioned on the first main surface 10*a*, at the center in the width direction W and that extends in the length direction L, a second hypothetical straight line L2 that is in contact with the top of a portion of the first outer electrode 13, which is positioned on the first end surface 10*e*, at the center in the width direction W and that extends in the thickness direction T, and a third hypothetical straight line L3 that is in contact with the first outer electrode 13 at the center in the width direction W and that is inclined preferably at about 45° with respect to the first hypothetical straight line L1 and the second hypothetical straight line L2 preferably is about 450 µm$^2$ or larger, for example. Thus, the equivalent radius of curvature of a surface of a portion of the first outer electrode 13 that is positioned on a ridge line that is defined by the first main surface 10*a* and the first end surface 10*e* is large. Therefore, in the case where a stress is applied between a wiring substrate in which the multilayer ceramic electronic component 1 has been embedded and the multilayer ceramic electronic component 1, the stress is less likely to concentrate at a particular position. Accordingly, the degree of contact between the multilayer ceramic electronic component 1 and the wiring substrate is less likely to deteriorate.

However, in the case where the area S1 is too large, the thickness of the portion of the first outer electrode 13, which is positioned on the ridge line defined by the first end surface 10*e* and the first main surface 10*a*, may sometimes be excessively reduced. Therefore, it is preferable that the area S1 be about 1,200 µm$^2$ or smaller, for example.

Note that the area S1 can be calculated by projecting the multilayer ceramic electronic component 1 from the first side surface 10*c* or the second side surface 10*d* and by dividing by two the product of the distance from an intersection point of the first hypothetical straight line L1 and the second hypothetical straight line L2 to an intersection point of the first hypothetical straight line L1 and the third hypothetical straight line L3 and the distance from the intersection point of the first hypothetical straight line L1 and the second hypothetical straight line L2 to an intersection point of the second hypothetical straight line L2 and the third hypothetical straight line L3.

For a reason similar to that in the case of the area S1, it is preferable that the area S2 of a triangle that is defined by the second hypothetical straight line L2, a fourth hypothetical straight line L4 that is in contact with the top of a portion of the first outer electrode 13, which is positioned on the second main surface 10*b*, at the center in the width direction W and that extends in the length direction L, and a fifth hypothetical straight line L5 that is in contact with the first outer electrode 13 at the center in the width direction W and that is inclined preferably at about 45° with respect to the second hypothetical straight line L2 and the fourth hypothetical straight line L4 preferably be about 450 µm$^2$ or larger and about 1,200 µm$^2$ or smaller, for example.

Note that the area S2 can be calculated by projecting the multilayer ceramic electronic component 1 from the first side surface 10*c* or the second side surface 10*d* and by dividing by two the product of the distance from an intersection point of the fourth hypothetical straight line L4 and the second hypothetical straight line L2 to an intersection point of the fourth hypothetical straight line L4 and the fifth hypothetical straight line L5 and the distance from the intersection point of the fourth hypothetical straight line L4 and the second hypothetical straight line L2 to an intersection point of the second hypothetical straight line L2 and the fifth hypothetical straight line L5.

It is preferable that the area S3 of a triangle that is defined by a sixth hypothetical straight line L6 that is in contact with the top of a portion of the second outer electrode 14, which is positioned on the first main surface 10*a*, at the center in the width direction W and that extends in the length direction L, a seventh hypothetical straight line L7 that is in contact with the top of a portion of the second outer electrode 14, which is positioned on the second end surface 10f, at the center in the width direction W and that extends in the thickness direction T, and an eighth hypothetical straight line L8 that is in contact with the second outer electrode 14 at the center in the width direction W and that is inclined preferably at about 45° with respect to the sixth hypothetical straight line L6 and the seventh hypothetical straight line L7 preferably be about 450 μm$^2$ or larger and about 1,200 μm$^2$ or smaller, for example.

Note that the area S3 can be calculated by projecting the multilayer ceramic electronic component 1 from the first side surface 10c or the second side surface 10d and by dividing by two the product of the distance from an intersection point of the fourth hypothetical straight line L4 and the seventh hypothetical straight line L7 to an intersection point of the fourth hypothetical straight line L4 and the eighth hypothetical straight line L8 and the distance from the intersection point of the fourth hypothetical straight line L4 and the seventh hypothetical straight line L7 to an intersection point of the seventh hypothetical straight line L7 and the eighth hypothetical straight line L8.

It is preferable that the area S4 of a triangle that is defined by the seventh hypothetical straight line L7, a ninth hypothetical straight line L9 that is in contact with the top of a portion of the second outer electrode 14, which is positioned on the second main surface 10b, at the center in the width direction W and that extends in the length direction L, and a tenth hypothetical straight line L10 that is in contact with the second outer electrode 14 at the center in the width direction W and that is inclined preferably at about 45° with respect to the seventh hypothetical straight line L7 and the ninth hypothetical straight line L9 preferably be about 450 μm$^2$ or larger and about 1,200 μm$^2$ or smaller, for example.

Note that the area S∝can be calculated by projecting the multilayer ceramic electronic component 1 from the first side surface 10c or the second side surface 10d and by dividing by two the product of the distance from an intersection point of the ninth hypothetical straight line L9 and the seventh hypothetical straight line L7 to an intersection point of the ninth hypothetical straight line L9 and the tenth hypothetical straight line L10 and the distance from the intersection point of the ninth hypothetical straight line L9 and the seventh hypothetical straight line L7 to an intersection point of the seventh hypothetical straight line L7 and the tenth hypothetical straight line L10.

Figure 3:
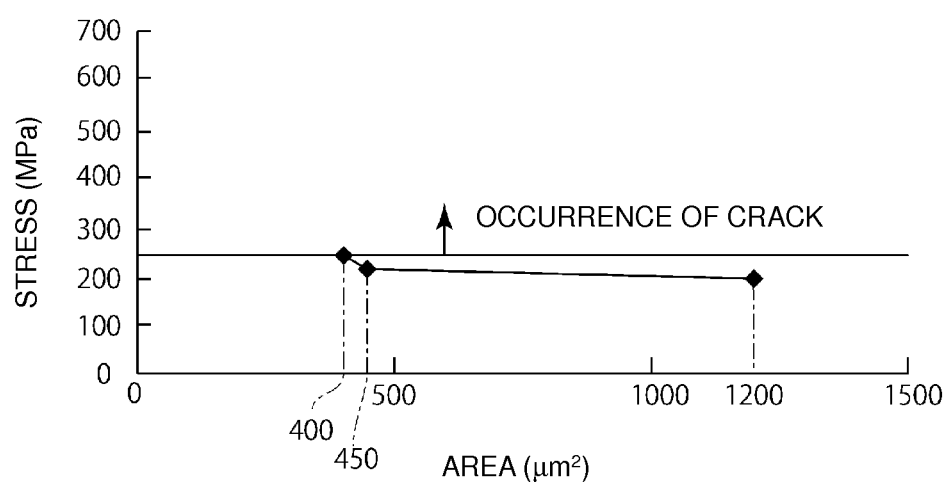
FIG. 3 is a graph showing a relationship between areas S (S1 to S4) and maximum values of a stress that is generated between a ceramic electronic component and a wiring substrate when the wiring substrate is heated up from about −55° C. to about 125° C.

FIG. 3 is a graph showing maximum values of a stress that is applied between a ceramic electronic component that has the following design parameters and a wiring substrate that has the following design parameters when a sample that is formed by embedding the ceramic electronic component in the wiring substrate is heated up from about −55° C. to about 125° C., for example.

It is understood from the results shown in FIG. 3 that the maximum value of the stress applied between the ceramic electronic component and the wiring substrate is significantly reduced by setting each of the areas S1 to S4 to about 450 μm$^2$ or larger, for example. Note that when each of the areas S1 to S4 was about 400 μm$^2$ or smaller, cracks were generated in the multilayer ceramic electronic component.
Design Parameters of Ceramic Electronic Component
  Dimension in Length Direction: 1.00 mm
  Dimension in Width Direction: 0.50 mm
  Dimension in Thickness Direction: 0.15 mm
  Distance between End Surface of Ceramic Element Body and Top of Portion of Outer Electrode Positioned on First Main Surface: 0.30 mm
  Young's Modulus: 180 Gpa
  Coefficient of Thermal Expansion (CTE): 8.00 ppm/° C.
Design Parameters of Wiring Substrate
  Structure: Cu wiring/prepreg/core substrate/prepreg/Cu wiring
  Material of Wiring: Cu
  Thickness of Wiring: 30 μm
  Coefficient of Thermal Expansion (CTE) of Wiring: 16 ppm/° C.
  Modulus of Elasticity of Wiring: 110 GPa
  Thickness of Core Substrate: 150 μm Coefficient of Thermal Expansion (CTE) of Core Substrate: 3 ppm/° C.
  Modulus of Elasticity of Core Substrate: 30 GPa
  Glass Transition Point (Tg) of Core Substrate: 200° C.
  Thickness of Prepreg: 45 μm
  Coefficient of Thermal Expansion (CTE) of Prepreg: 3 ppm/° C.
  Modulus of Elasticity of Prepreg: 30 GPa
Manufacturing Method of Multilayer Ceramic Electronic Component 1

A non-limiting example of a method of manufacturing the multilayer ceramic electronic component 1 is not particularly limited. For example, the multilayer ceramic electronic component 1 can be manufactured as follows.

First, the electronic component body 10 that includes the first inner electrodes 11 and the second inner electrodes 12 is prepared. More specifically, ceramic green sheets are fabricated by applying ceramic paste containing ceramic powder in such a manner as to have the shape of a sheet and drying the ceramic paste by, for example, a screen printing method or the like.

Next, ceramic green sheets on each of which a conductive pattern for use in the formation of inner electrodes has been formed by applying a conductive paste for use in the formation of inner electrodes onto the ceramic green sheet in such a manner as to form a predetermined pattern by, for example, a screen printing method or the like and ceramic green sheets on each of which such a conductive pattern for use in the formation of inner electrodes is not formed are prepared. Note that, for example, a binder and a solvent, which are commonly known, may be included in the ceramic paste and the conductive paste for use in the formation of inner electrodes.

Then, a predetermined number of the ceramic green sheets on each of which the conductive pattern for use in the formation of inner electrodes is not formed are stacked on top of one another, the ceramic green sheets on each of which the conductive pattern for use in the formation of inner electrodes has been formed are sequentially stacked on the ceramic green sheets, and in addition, a predetermined number of the ceramic green sheets on each of which the conductive pattern for use in the formation of inner electrodes is not formed are stacked on top of one another, so that a mother multilayer body is fabricated. Note that the mother multilayer body may be pressed in a stacking direction by a method such as isostatic pressing as may be necessary.

The mother multilayer body is cut in such a manner as to have a predetermined shape and predetermined dimensions, so that a plurality of raw electronic component bodies are fabricated. In this case, barrel grinding or the like may be performed on each of the raw electronic component bodies so as to round ridgeline portions and corner portions of the raw electronic component bodies.

After that, each of the raw electronic component bodies is fired. As a result, the electronic component body 10 is completed. Note that the temperature at which the raw electronic component bodies are fired may be suitably set in accordance with the ceramic and the conductive material that are used. The temperature at which the raw electronic component bodies are fired can preferably be set to, for example, about 900° C. to about 1,300° C.

Next, first and second fired electrode layers are formed by applying a conductive paste onto end surfaces of the electronic component body 10, which has been fired, and baking the conductive paste. Note that it is preferable that the baking temperature be, for example, about 700° C. to about 1,000° C.

Next, the first outer electrode 13 and the second outer electrode 14 can be completed by forming a Cu plating film on the first and second fired electrode layers by a coating method. The multilayer ceramic electronic component 1 can be manufactured in the above manner.

The conductive paste can be applied on the electronic component body 10 by, for example, dipping the electronic component body 10 into a chamber filled with the conductive paste. The areas S1 to S4 can be adjusted by adjusting the speed at which the electronic component body 10, which has been dipped, is raised from the conductive paste chamber.

More specifically, when the speed at which the electronic component body 10, which has been dipped, is raised from the conductive paste chamber increases, the amount of the paste that is held by the electronic component body 10 increases. Thus, the radius of curvature of each of the ridgeline portions of the first outer electrode 13 and the second outer electrode 14 increases, so that the areas S1 to S4 increase. When the speed at which the electronic component body 10, which has been dipped, is raised from the conductive paste chamber decreases, the amount of the paste that is held by the electronic component body 10 decreases. Thus, the radius of curvature of each of the ridgeline portions of the first outer electrode 13 and the second outer electrode 14 decreases, so that the areas S1 to S4 decreases.

In addition, the areas S1 to S4 can be increased by increasing the viscosity of the conductive paste. Contrary to this, the areas S1 to S4 can be decreased by decreasing the viscosity of the conductive paste.

A multilayer ceramic electronic component that preferably has the areas S1 to S4 each of which was about 450 $\mu m^2$ was fabricated by applying a conductive paste onto an electronic component body that has dimensions (length×width×thickness) of, for example, about 1.0 mm×about 0.5 mm×about 0.11 mm in the following manner.

First, the electronic component body was dipped into a chamber filled with a conductive paste (viscosity: 5 Pa·s to 10 Pa·s) that has a thickness of 300 $\mu m$ at a speed of 120 mm/min so as to reach the bottom surface of the conductive paste chamber and held for about 0.1 seconds, for example. After that, the electronic component body was raised from the conductive paste chamber to a position about 350 $\mu m$ above the conductive paste chamber at a speed of about 30 mm/min and held for about 5 seconds, for example. Then, the electronic component body was raised to a position about 1,500 $\mu m$ above the conductive paste chamber at a speed of about 6 mm/min, for example. After that, the electronic component body was dipped into another conductive paste chamber (viscosity: about 5 Pa·s to about 10 Pa·s) that has a thickness of about 15 $\mu m$ at a speed of about 30 mm/min in such a manner as to reach the bottom surface of the conductive paste chamber and held for about 0.1 seconds, for example. Then, the electronic component body was raised from the conductive paste chamber to a position about 50 $\mu m$ above the conductive paste chamber at a speed of about 6 mm/min and held for about 5 seconds, for example. After that, the electronic component body was raised to a position about 1,000 $\mu m$ above the conductive paste chamber at a speed of about 6 mm/min, for example, so that a conductive paste layer was formed. After the conductive paste layer had been dried with hot air in an atmosphere at a temperature in a range of about 60° C. to about 180° C. for about 10 minutes, the conductive paste layer was baked at a temperature of about 600° C. to about 950° C., and after that, a Cu plating film having a thickness of about 5 $\mu m$ to about 10 $\mu m$ was formed, for example, so that the outer electrodes were fabricated. When the areas S1 to S4 in the outer electrodes, which had been obtained, were measured, each of the areas S1 to S4 was about 450 $\mu m^2$, for example.

A multilayer ceramic electronic component that has the areas S1 to S4 each of which was about 1,200 $\mu m^2$ was fabricated by applying a conductive paste onto an electronic component body that has dimensions (length×width×thickness) of, for example, about 1.0 mm×about 0.5 mm×about 0.15 mm, for example, in the following manner.

First, the electronic component body was dipped into a chamber filled with a conductive paste (viscosity: about 5 Pa·s to about 10 Pa·s) that has a thickness of about 300 $\mu m$ at a speed of about 90 mm/min so as to reach the bottom surface of the conductive paste chamber and held for about 0.1 seconds, for example. After that, the electronic component body was raised from the conductive paste chamber to a position about 350 $\mu m$ above the conductive paste chamber at a speed of about 30 mm/min and held for about 8 seconds, for example. Then, the electronic component body was raised to a position about 1,500 $\mu m$ above the conductive paste chamber at a speed of about 6 mm/min, for example. After that, the electronic component body was dipped into another conductive paste chamber (viscosity: about 5 Pa·s to about 10 Pa·s) that has a thickness of about 50 $\mu m$ at a speed of about 30 mm/min in such a manner as to reach the bottom surface of the conductive paste chamber and held for about 0.1 seconds, for example. Then, the electronic component body was raised from the conductive paste chamber to a position about 150 $\mu m$ above the conductive paste chamber at a speed of about 6 mm/min and held for about 0.1 seconds, for example. After that, the electronic component body was raised to a position about 4,000 $\mu m$ above the conductive paste chamber at a speed of about 420 mm/min, for example, so that a conductive paste layer was formed. After the conductive paste layer had been dried with hot air in an atmosphere at a temperature in a range of about 60° C. to about 180° C. for about 10 minutes, the conductive paste layer was baked at a temperature of about 600° C. to about 950° C., and after that, a Cu plating film having a thickness of about 5 $\mu m$ to about 10 $\mu m$ was formed, for example, so that the outer electrodes were fabricated. When the areas S1 to S4 in the outer electrodes, which had been obtained, were measured, each of the areas S1 to S4 was about 1,200 $\mu m^2$, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
   an electronic component body including first and second main surfaces extending in a length direction and a width direction, first and second side surfaces extending in the length direction and a thickness direction, and first and second end surfaces extending in the width direction and the thickness direction;
   a first outer electrode that extends from the first end surface to the first main surface and the second main surface; and
   a second outer electrode that extends from the second end surface to the first main surface and the second main surface; wherein
   a dimension of the electronic component in the length direction is about 0.6 mm to about 1.0 mm, a dimension of the electronic component in the width direction is about 0.3 mm to about 0.5 mm, and a dimension of the electronic component in the thickness direction is about 0.07 mm to about 0.15 mm;
   an area of a first triangle that is defined by, when the electronic component is projected from the first side surface or the second side surface, a first hypothetical straight line that is in contact with a top of a portion of the first outer electrode, which is positioned on the first main surface, and that extends in the length direction, a second hypothetical straight line that is in contact with a top of a portion of the first outer electrode, which is positioned on the first end surface, that extends in the thickness direction, and that is perpendicular or substantially perpendicular to the first hypothetical straight line, and a third hypothetical straight line that is in contact with the first outer electrode and that is inclined at about 45° with respect to the first and second hypothetical straight lines is about 450 μm$^2$ or larger;
   an area of a second triangle that is defined by, when the electronic component is projected from the first side surface or the second side surface, the second hypothetical straight line, a fourth hypothetical straight line that is in contact with a top of a portion of the first outer electrode, which is positioned on the second main surface, that extends in the length direction, and that is perpendicular or substantially perpendicular to the second hypothetical straight line, and a fifth hypothetical straight line that is in contact with the first outer electrode and that is inclined at about 45° with respect to the second and fourth hypothetical straight lines is about 450 μm$^2$ or larger;
   an area of a third triangle that is defined by, when the electronic component is projected from the first side surface or the second side surface, a sixth hypothetical straight line that is in contact with a top of a portion of the second outer electrode, which is positioned on the first main surface, and that extends in the length direction, a seventh hypothetical straight line that is in contact with a top of a portion of the second outer electrode, which is positioned on the second end surface, that extends in the thickness direction, and that is perpendicular or substantially perpendicular to the sixth hypothetical straight line, and an eighth hypothetical straight line that is in contact with the second outer electrode and that is inclined at about 45° with respect to the sixth and seventh hypothetical straight lines is about 450 μm$^2$ or larger; and
   a fourth triangle that is defined by, when the electronic component is projected from the first side surface or the second side surface, the seventh hypothetical straight line, a ninth hypothetical straight line that is in contact with a top of a portion of the second outer electrode, which is positioned on the second main surface, that extends in the length direction, and that is perpendicular or substantially perpendicular to the seventh hypothetical straight line, and a tenth hypothetical straight line that is in contact with the second outer electrode and that is inclined at about 45° with respect to the seventh and ninth hypothetical straight lines is about 450 μm$^2$ or larger.

2. The electronic component according to claim 1, wherein each of the areas of the first triangle, the second triangle, the third triangle, and the fourth triangle is about 1,200 μm$^2$ or smaller.

3. The electronic component according to claim 1, wherein the first and second outer electrodes include Cu plating films that define surface layers of the first and second outer electrodes.

4. The electronic component according to claim 1, wherein the electronic component is one of a ceramic capacitor, a piezoelectric component, a thermistor, and an inductor.

5. The electronic component according to claim 1, wherein a ratio of the dimension in the length direction to the dimension in the width direction is about 1.20 to about 3.33.

6. The electronic component according to claim 1, wherein a ratio of the dimension in the thickness direction to the dimension in the length direction is about 4.00 to about 14.29.

7. The electronic component according to claim 1, wherein the electronic component body includes ceramic portions, a plurality of first inner electrodes and a plurality of second inner electrodes provided in the multilayer body.

8. The electronic component according to claim 7, wherein one of the first inner electrodes and one of the second inner electrodes that are adjacent to each other in the thickness direction face each other with a ceramic portion interposed therebetween.

9. The electronic component according to claim 8, wherein a thickness of the ceramic portion is about 0.6 μm to about 1.8 μm.

10. The electronic component according to claim 8, wherein a thickness of the ceramic portion is about 0.8 μm to about 1.2 μm.

11. The electronic component according to claim 7, wherein a thickness of each of the first inner electrodes and each of the second inner electrodes is about 0.3 μm to about 1.0 μm.

12. The electronic component according to claim 1, wherein the first outer electrode and the second outer electrode each include at least one of Ni, Cu, Ag, Pd, Au, and an Ag—Pd alloy.

13. The electronic component according to claim 1, wherein each of the first outer electrode and the second outer electrode is one of a fired electrode on which a conductive paste has been baked and a multilayer body including a fired electrode and a plating film provided on the fired electrode.

14. The electronic component according to claim 1, wherein an outermost layer of each of the first outer electrode and the second outer electrode is a Cu plating film.

15. The electronic component according to claim 1, wherein the length of the electronic component is about 1.0 mm, the width of the electronic component is about 0.5 mm, and the thickness of the electronic component is about 0.15 mm.

* * * * *